United States Patent [19]

Andow

[11] Patent Number: 4,803,635
[45] Date of Patent: Feb. 7, 1989

[54] INFORMATION DATA OUTPUT DEVICE FOR ELECTRIC-POWER SYSTEMS

[75] Inventor: Fumio Andow, Hachioji, Japan

[73] Assignee: Kabushi Kaisha Toshiba, Kawasaki, Japan

[21] Appl. No.: 927,382

[22] Filed: Nov. 6, 1986

[30] Foreign Application Priority Data

Nov. 7, 1985 [JP] Japan ................ 60-247959

[51] Int. Cl.⁴ ........................ G06F 15/56; G01R 19/00
[52] U.S. Cl. .................................. 364/483; 324/512; 324/521; 324/522; 364/481; 364/492
[58] Field of Search ............... 364/481, 483, 492, 493; 324/512, 521, 522; 361/42

[56] References Cited

U.S. PATENT DOCUMENTS

| 3,710,239 | 1/1973 | Nakamura | 324/512 |
|---|---|---|---|
| 3,731,152 | 5/1973 | Rockefeller, Jr. | 317/27 R |
| 4,063,165 | 12/1977 | Lanz | 324/522 |
| 4,073,008 | 2/1978 | Andow et al. | 364/483 |
| 4,107,778 | 8/1978 | Nii et al. | 324/522 |
| 4,249,124 | 2/1981 | De Mesmaeker | 324/521 |
| 4,455,612 | 6/1984 | Girgis et al. | 364/483 |
| 4,466,071 | 8/1984 | Russell, Jr. | 364/483 |
| 4,484,290 | 11/1984 | Bagnall et al. | 364/483 |
| 4,559,491 | 12/1985 | Saha | 324/522 |
| 4,560,922 | 12/1985 | Heller et al. | 324/521 |
| 4,570,231 | 2/1986 | Bunch | 364/481 |
| 4,618,933 | 10/1986 | Vitins | 364/483 |
| 4,672,555 | 6/1987 | Hart et al. | 364/483 |

OTHER PUBLICATIONS

IEEE Transactions on Power Apparatus and Systems, vol. PAS-100, No. 4, Apr. 1981, pp. 2026-2033; A. G. Phadke et al.

Toshiba Review, No. 148, 1984, pp. 11-14, Tokyo, Japan, M. Muraoka et al.

Primary Examiner—Gary Chin
Assistant Examiner—Kevin J. Teska
Attorney, Agent, or Firm—Foley & Lardner, Schwartz, Jeffery, Schwaab, Mack, Blumenthal & Evans

[57] ABSTRACT

According to the present invention, a sampled value of a reference voltage $\dot{V}_p$ which is a voltage (in general, a relative voltage to ground, an interphase voltage or a positive sequence voltage) prior to the occurrence of a fault in an electric-power system and a sampled value of the quantity of electricity $\dot{E}$ (a voltage or current in each phase or a symmetrical component voltage or current) during a fault time period or after the recovery of a fault are used to compute a plurality of functional values capable of specifying the phase angle $\theta$ or the value of $\theta$ of said quantity of electricity $\dot{E}$ in relation to said reference voltage $\dot{V}_p$ and deliver them as information data. When the relative phase angle between the quantity of electricity $\dot{E}$ during a fault or after the recovery of a fault and a voltage (reference voltage) $\dot{V}_p$ prior to the occurrence of a fault is clarified in this manner, the relative phase angles of reference voltages $\dot{V}_p$ among a plurality of electric stations prior to the occurrence of a fault are computed by obtaining the information of normal operating conditions of the electric power system concerning to a voltage, current, reactive power and the state of a circuit breaker and accomplishing the arithmetic operations of the information thus obtained and the constants of devices and equipment constituting the electric-power system. Therefore, the relative phase angles of the quantity of electricity $\dot{E}$ among a plurality of electric stations during a fault period or after the recovery of a fault can be clarified.

12 Claims, 7 Drawing Sheets

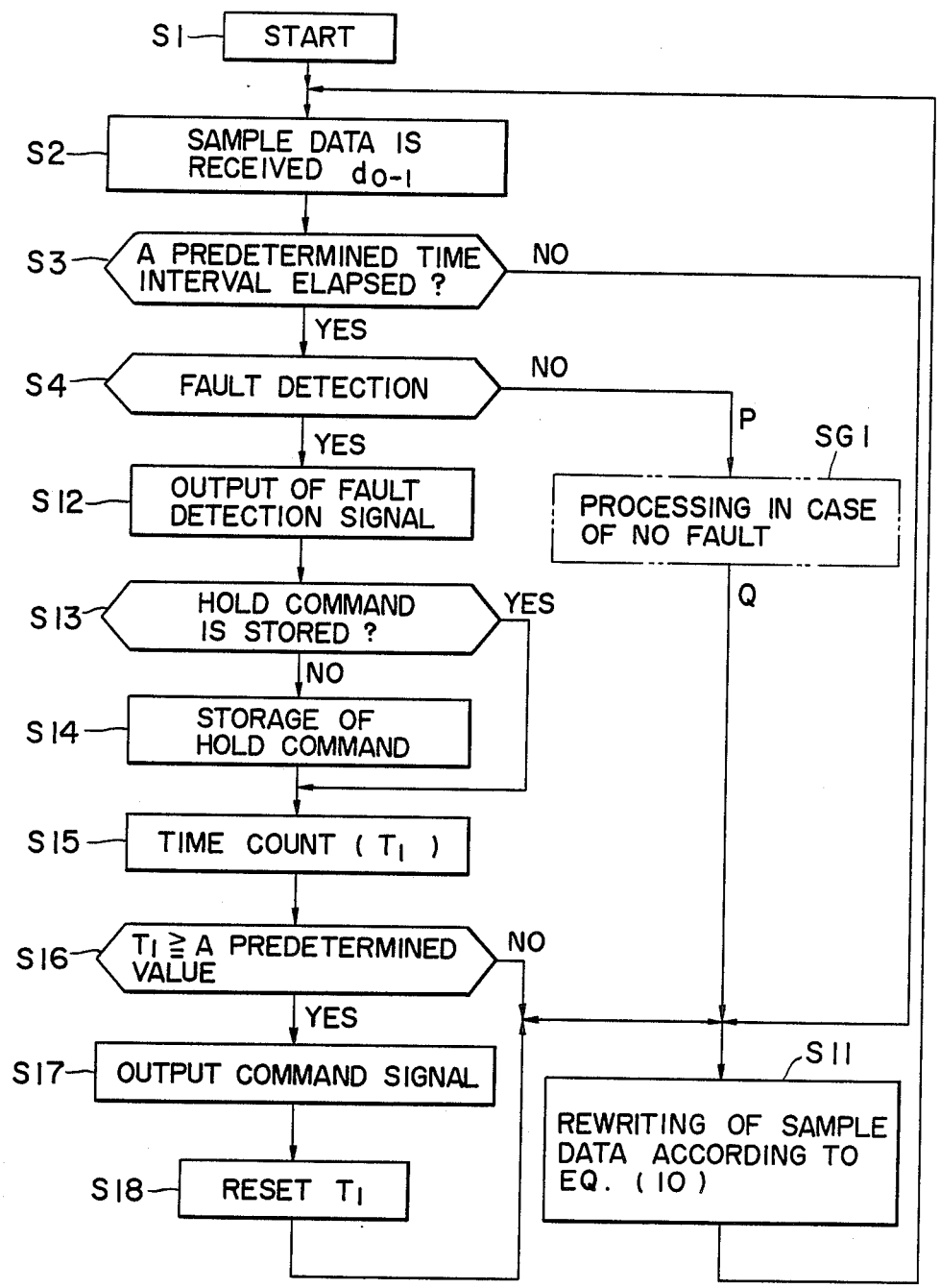
F I G. 4

INFORMATION DATA OUTPUT DEVICE FOR ELECTRIC-POWER SYSTEMS

BACKGROUND OF THE INVENTION

The present invention relates to an improvement of a device for delivering as digital data the quantity of electricity and its functional values in the case of a failure of an electric-power system such as disconnections or ground faults during the failure time interval or after the recovery of the failure.

Since the practical introduction of digital computation type protective relays utilizing computers, the magnitude of the voltage, the amount of current and the values of impedance and its reactance measured by a distance relay have been obtained as digital data, but with such data it and is impossible to clarify the quantity of electricity between a plurality of electric stations.

When a fault is limited to one point in an electric-power system, is so simple that the fault mode remains unchanged and can be interrupted by the correct operation of a protective relay, there is no problem in general to analyze the fault and the response of the protective relay even though the phase relationship between a plurality of quantities of electricity is not clear. However, when a fault results in complicated modes such as (i) when faults occur at a plurality of points simultaneously (multiple faults);

(ii) when disconnections and ground faults occur simultaneously (disconnection/ground fault); and (iii) when the number of phases of faults varies during a fault time interval (evolving fault)

and when the voltage, the current phenomenon and the response of the protective relays are analyzed at the time when these faults occurred in which they are sequentially interrupted, it is very advantageous to clarify the mutual relationships of quantities of electricity among a plurality of electric stations during a fault time interval.

Furthermore, in the case of determining a fault point by using the voltage and the current in an electric-power system, when the mutal relationships of the quantities of electricity among a plurality of electric stations are clarified, errors can be minimized in most cases. These mutual relationships will be described below with reference to FIG. 8 which is a circuit diagram used to explain the phenomenon resulting from a fault of a two-terminal transmission line. That is, L is a transmission line; A and B are terminals thereof; and F is a fault point. The currents $\dot{I}_A$ and $\dot{I}_B$ flow from the terminals A and B, respectively, and the current $\dot{I}_F$ flows at the fault point F which has a fault-point resistance $\dot{R}_F$. When the impedance of the transmission line is $\dot{Z}_L$ per kilometer and the distance between the fault point F and the terminal AF is x km, then the impedance between A and F becomes $x\dot{Z}_L$. The voltage at the terminal A is $\dot{V}_A$ and is given by $$\dot{V}_A = \dot{I}_A \times \dot{Z}_L + \dot{I}_F \dot{R}_B \qquad (1)$$

In this case, the most precise distance can be obtained from the following equation:

$$x = V_A \sin \Phi_V / I_A Z_L \sin \Phi_I \qquad (2)$$

where $\Phi_V$ is the angle of lead of $\dot{V}_A$ relative to $\dot{I}_F$, and
$\Phi_I$ is the angle of lead of $\dot{I}_A \dot{Z}_L$ relative to $\dot{I}_F$.

FIG. 9 is a vector diagram used to explain the above-described relationship and shows some phase difference between the currents $\dot{I}_F$ and $\dot{I}_A$.

The voltage $\dot{V}_A$ is expressed by two terms in Eq. (1), $\dot{R}_F$ is a pure resistance and $\dot{Z}_L$ is an impedance having a high inductance component so that $\dot{I}_F \dot{R}_F$ are in phase with $\dot{I}_F$ and $\dot{I}_A \dot{Z}_L$ leads in phase slightly by 90° from $\dot{I}_A$. The numerator $V_A \sin \Phi_V$ and the denominator $I_A \sin \Phi_I$ are represented by the projections, respectively, on the line o-l of $\dot{V}_A$ and $\dot{I}_A \dot{Z}_L$. Since the projection of $\dot{V}_A$ is equal to the projection $x\dot{I}_A\dot{Z}_L$, the precise distance x is obtained from Eq. (2).

One of the features of the above-described principle resides in the fact that the influence of the voltage drop $\dot{I}_F \dot{R}_F$ across the fault-point resistor is eliminated so that the detection of a fault point distance can be measured with a high degree of accuracy, but in order to measure the current $\dot{I}_F$, it is required to obtain the amount of the current $\dot{I}_B$ and the relative phase angle between the current $\dot{I}_B$ and the current $\dot{I}_A$.

FIG. 10 is a view used to explain the measurement of a fault-point distance on a transmission line with three terminals. The same reference symbols are used to designate similar parts both in FIGS. 8 and 10. In FIG. 10, C is a third terminal of the transmission line L and J designates the junction point. The current $\dot{I}_C$ flows from the terminal C. The impedance between the terminal A and the junction J is $\dot{Z}_{AJ}$; the distance between the junction J and the fault point F is ×km; and the impedance per km is $\dot{Z}_L$.

In this case, even if the desire for eliminating the influence of an error due to the voltage drop $\dot{I}_F \dot{R}_F$ across the fault-point resistance obtained by the fault-point current $\dot{I}_F$ is given up, a further problem arises. That is, when the fault point F exists between the terminal C and the junction J and if the power source connected to the terminal C is weak or low, the current $\dot{I}_C$ hardly flows so that the distance measurement at the terminal C becomes impossible. It follows therefore that the distance measurement must be made at the terminal, for instance, A which is connected to a high backup power supply and at which a high amount of fault current flows.

In this case, the voltage $\dot{V}_A - \dot{I}_A \dot{Z}_{AJ}$ is given by the following equation:

$$\dot{V}_A - \dot{I}_A \dot{Z}_{AJ} = (\dot{I}_A + \dot{I}_B) \times \dot{Z}_L + \dot{I}_F \dot{R}_F \qquad (3)$$

and as in the case of Eq. (2), the distance x is given by the following equation:

$$x = |V_A - \dot{I}_A \dot{Z}_{AJ}| \sin \Phi_V' / |(\dot{I}_A + \dot{I}_B)\dot{Z}_L| \sin \Phi_I' \qquad (4)$$

where $\Phi_V'$ is the angle of lead of $\dot{V}_A - \dot{I}_A \dot{Z}_{AJ}$ relative to $\dot{I}_F$, and $\Phi_I'$ is the angle of lead of $(\dot{I}_A + \dot{I}_B)\dot{Z}_L$ in relation to $I_F$.

In this case, even when the current $\dot{I}_F$ is in phase with $\dot{I}_A + \dot{I}_B$ or $\dot{I}_A$ and even if the distance to the fault point is measured without the use of the fault-point current $\dot{I}_F$, the current $\dot{I}_A + \dot{I}_B$ must be calculated and the relative phase angle between the currents $\dot{I}_A$ and $\dot{I}_B$ must be obtained.

Furthermore, after the recovery of fault, the electric power and the differences in phase angle between the voltages at various points fluctuate and out-of-step is occurred in the worst case. It is very important to analyze precisely these phenomena in order to ensure the stable operation of an electric-power system. To this end, so far the electronic computers have been used, but in the actual systems, the recorded data are only the electric power, the voltage and the amount of current. The difference between the results obtained by analysis and the results actually obtained has not been satisfactorily clarified and in order to clarify this difference, it becomes necessary to clarify the relative phase angles among the voltages at various stations after the recovery of fault.

As described above, various advantages can be attained by obtaining the data which can clarify the relative phase angles among the voltages at various stations during a fault time interval or after the recovery of fault. However, so far no means has been available for obtaining such data as described above. It is of course possible to detect the relative phase angles by transmitting the waveform of an instantaneous voltage or current value to a remote point by a PCM process or a frequency modulation process, but this method has a defect that a large amount of information must be transmitted at a high speed.

SUMMARY OF THE INVENTION

The present invention was made to substantially overcome the above and other problems encountered in the prior art information data output devices used in electric-power systems and has for its object to provide a device for obtaining the information data which can easily clarify the relative phase angles among the voltages at a plurality of stations during a fault time interval or after the recovery of fault in response to relatively little information.

To this end, according to the present invention, a voltage (normally a voltage in relation to the grounded voltage, an interphase voltage or a positive phase voltage) prior to a fault in an electric-power system is used as a reference voltage $\dot{V}_P$ and a value obtained by sampling the reference voltage and a value obtained by sampling the quantity of electricity E (the voltage or current in each phase or the symmetrical voltage or current) during a fault time interval or after the recovery of fault are calculated to obtain as information data a plurality of functional values capable of determining the phase angle $\theta$ of the quantity of electricity E in relation to the reference voltage $\dot{V}_P$ or specifying the angle of $\theta$.

When the magnitudes of E and $\dot{V}_P$ are represented by E and $V_P$, respectively, (for instance, effective values) and the angle of lead of E relative to $\dot{V}_P$ is $\theta$, the present invention can deliver the information data in the form of various combinations of:

$V_P E \cos\theta$ and $V_P E \sin\theta$ (5)

$E \cos\theta$ and $E \sin\theta$ (6)

$\sin\theta$ (or $\cos\theta$) and $\tan\theta$ (or $\cot\theta$) (7)

$\theta$ (8)

$(E/V_P)\cos\theta$ and $(E/V_P)\sin\theta$ (9)

Furthermore, the present invention is not limited to the combinations of the above-described equations and can provide various combinations of $V_P E \cos\theta$ and $(E/V_P)\sin\theta$; and $V_P E \cos\theta$ and $\tan\theta$ as far as the value of $\theta$ is within the range from 0° to 360° or in the range from −180° to +180°.

When the relative phase angle between each quantity of electricity $\dot{E}$ during a fault time interval or after the recovery of fault and the voltage (reference voltage) $\dot{V}_P$ can be clarified in the manner described above, the relative phase angles of the reference voltages $\dot{V}_P$ at a plurality of electric stations prior to the occurrence of a fault can be obtained from the normal operation mode of the system such as the voltage, the power, the reactive power and the stage of a switching means and the constant of devices and equipment constituting the electric-power system so that the relative phase angles among the quantities of electricity $\dot{E}$ at a plurality of electric stations during a fault time interval or after the recovery of fault can be clarified.

BRIEF DESCRIPTION OF THE DRAWINGS

FIG. 4 is a flowchart used to explain the mode of operation thereof;

DESCRIPTION OF THE PREFERRED EMBODIMENTS

Figure 1:
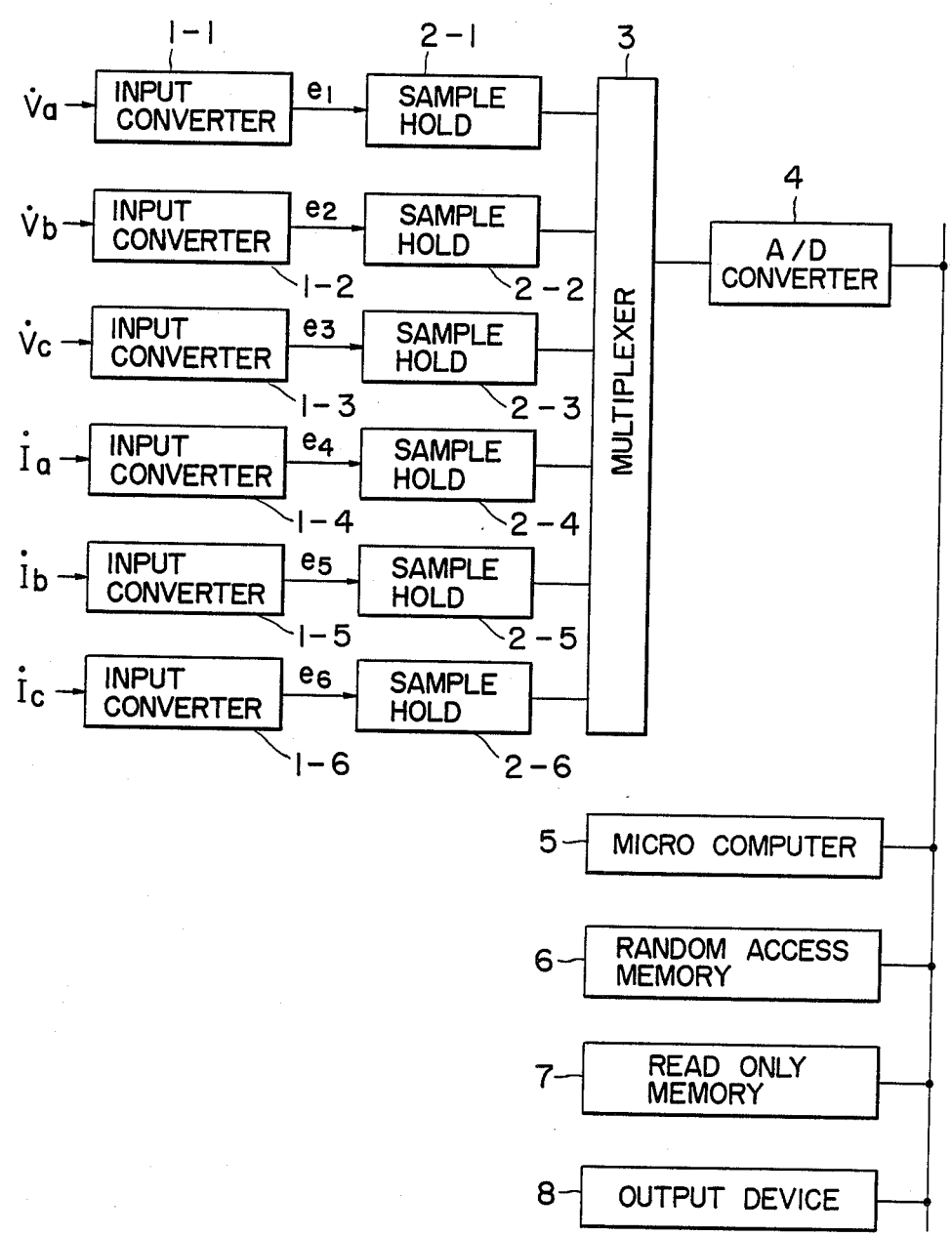
FIG. 1 shows the construction of a first embodiment of the present invention.

FIG. 1 shows the construction of a first embodiment of the present invention. The voltages $\dot{V}a$, $\dot{V}b$ and $\dot{V}c$ and the currents $\dot{I}a$, $\dot{I}b$ and $\dot{I}c$ of the phases a, b and c of an electric power system are applied to input converters 1-1~1-6, respectively, and are converted into the voltages $e_1 \sim e_6$, respectively. Each input converter incorporates a bandpass filter so that the output is in the form of an input quantity of electricity, whose high-frequency component and DC component are removed, is obtained from the input converter.

The voltages $e_1 \sim e_6$ are applied to sample-and-hold circuits 2-1~2-6, respectively, so that all the voltages are simultaneously sampled and the sampled voltages are held immediately before the next sampling is made. The sampling frequency is an integer multiple such as 8, 12, 16 or 24 times the frequency of the electric-power system. The held voltages are applied to a multiplexer 3 and the voltages derived from the sample-and-hold circuits 2-1~2-6 are applied to a sequential analog-to-digital (A/D) converter 4 and are converted into digital data which in turn are stored in a random access memory (RAM) 6 for a predetermined time interval.

In response to the stored digital data, a microcomputer (MPU) 5 executes arithmetic operations in accordance with a program stored in a read-only memory (ROM) 7 to obtain information data which in turn is delivered to an output device 8. Various conventional means may be used to select the mode of the information data output. For instance, the output may be displayed by counter display lamps, may be printed out by a typewriter or may be converted into the PCM signal for the transmission to a remote station.

Figure 2:
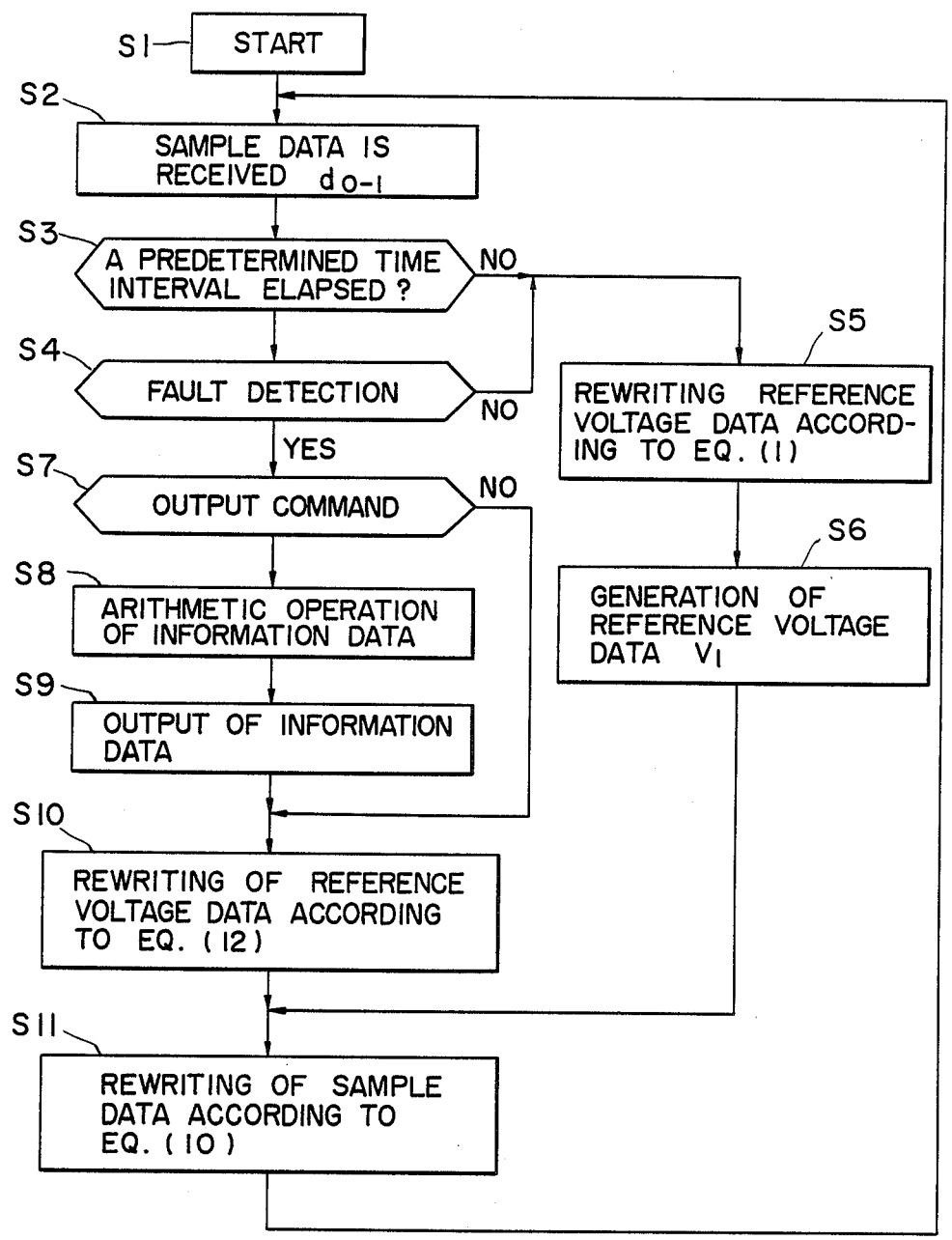
FIG. 2 is a flowchart used to explain the mode of operation thereof.

Referring next to FIG. 2, the mode of operation of the first embodiment will be described below. In the step 1, the operation is started so that in the second step 2, the digital data corresponding to the sampled values of the voltages $e_1 \sim e_6$, respectively, (to be referred to as "sample data" hereinafter in this specification) are derived. All the sample data thus derived is represented by $d_{0\text{-}1}$. Next in the step 3, it is detected whether or not a predetermined time interval has elapsed and if the result is yes, a fault detection is carried out in the step. When a fault detection is not made or before a predetermined time interval has elapsed, the operation shifts to the step 5 so that the reference voltage data are rewritten in accordance with Eq. (11) to be described hereinafter and after the reference data $V_1$ is obtained in the step 6, the operation shifts to the step 11.

When fault detection is carried out in the step S4, the operation shifts to the step S7 so as to detect whether or not there exists the output command of a procedure to be described hereinafter. If there is no output command, the operation shifts to the step S11. If there is an output command, the operation shifts to the step S8 to compute the information data which in turn is delivered in the step S9. Next the operation proceeds to the step S10 in which the reference voltage data is rewritten in accordance with Eq. (12) to be described hereinafter and the operation proceeds to the step S11 in which the sample data is rewritten in accordance with Eq. (10) to be described hereinafter and then the operation shifts back to the step S2. Thereafter the above-described operation is recycled.

Next, the process in each step will be described. The processes in respective steps are different depending upon a sampling frequency so that they will be described when the sampling frequency is 12 times as high as the frequency of the electric-power system; that is, when 12 samplings are made during one cycle of the frequency of the electric-power system. Unless otherwise stated, this sampling frequency remains unchanged hereinafter.

In the step S11, the sample data is rewritten according to the following equation:

$$d_{0\text{-}1} \rightarrow d_{0\text{-}2}, \ d_{0\text{-}2} \rightarrow d_{0\text{-}3}, \ldots d_{0\text{-}11} \rightarrow d_{0\text{-}12}, \ d_{0\text{-}12} \rightarrow d_{1\text{-}1},$$
$$d_{1\text{-}1} \rightarrow d_{1\text{-}2} \ldots d_{1\text{-}11} \rightarrow d_{1\text{-}12} \quad (10)$$

That is, the newest sampled value $d_{0\text{-}1}$ is stored as $d_{0\text{-}2}$ and the sampled value stored as $d_{0\text{-}2}$ is stored as $d_{0\text{-}3}$. In a like manner, each sampled value is shifted and stored and finally the sampled value $d_{0\text{-}11}$ is stored as $d_{0\text{-}12}$. The sample data $d_{0\text{-}12}$ is shifted to $d_{1\text{-}1}$ and the data $d_{1\text{-}1} \sim d_{1\text{-}11}$ are sequentially shifted and stored as $d_{1\text{-}2} \sim d_{1\text{-}12}$. As a result, the data $d_{1\text{-}12}$ is eliminated.

In the step S6, the reference voltage data $V_1$ is generated from the sample data $d_{1\text{-}12}$ prior to the rewriting of sample data in the step S11. That is, when the voltage in one phase, for instance, the voltage $\dot{V}a$ is used as a reference voltage, the a-phase voltage sample data is used as the data $v_1$. When an interphase voltage between the two phases, for instance, the difference ($\dot{V}a \sim \dot{V}b$) between the voltages $\dot{V}a$ and $\dot{V}b$ is used, the data representative of the difference of both voltages in the sample data $d_{1\text{-}12}$ is used as the data $v_1$.

In the step S5, the reference voltage data is rewritten according to the following equation:

$$v_1 \rightarrow v_2, \ v_2 \rightarrow v_3 \ldots v_{11} \rightarrow v_{12} \quad (11)$$

That is, the data $v_1 \sim v_{11}$ are sequentially shifted to $v_2 \sim v_{12}$, whereby $v_{12}$ is eliminated.

In the step S10, the reference voltage data are rewritten according to the following equation:

$$v_1 \rightarrow v_2, \ v_2 \rightarrow v_3 \ldots v_{11} \rightarrow v_{12}, \ v_{12} \rightarrow v_1 \quad (12)$$

Thus the sample data $d_{0\text{-}1} \sim d_{0\text{-}12}$ and $d_{1\text{-}1} \sim d_{1\text{-}12}$ represent one cycle of the frequencies in respective systems. $d_{0\text{-}1}$ and $d_{1\text{-}1}$; $d_{0\text{-}2}$ and $d_{1\text{-}2}$ and $d_{0\text{-}12}$ and $d_{1\text{-}12}$ mean the data during one-cycle difference. The sample data are independent of whether or not a fault detection is carried out and the oldest data $d_{1\text{-}12}$ is eliminated while the newest data $d_{0\text{-}1}$ is supplemented. Thus, the sample data is renewed at each sampling. In like manner, the reference voltage data $v_1 \sim v_{12}$ represent the data during one cycle. When no fault detection is carried out, the reference voltage data are renewed at each sampling and $v_1 \sim v_{12}$ represent the data before two cycles by $d_{0\text{-}1} \sim d_{0\text{-}12}$ and represent the data before one cycle by $d_{1\text{-}1} \sim d_{1\text{-}12}$. When a fault detection is carried out, the renewal of the reference voltage data $v_1 \sim v_{12}$ is interrupted and the data prior to the fault detection are held. In this case, the data $v_1 \sim v_{12}$ represent the data before an integer cycle (higher than two cycles) in relation to the data $d_{0\text{-}1} \sim d_{0\text{-}12}$.

In the step S3, an initial condition is set. That is, three cycles are needed before the sample data $d_{0\text{-}1} \sim d_{1\text{-}12}$ and the reference voltage data $v_1 \sim v_{12}$ are obtained. Therefore, during three cycles, only the storage of data is carried out and after a predetermined time interval has elapsed or when the required data have been completely stored, the fault detection is carried out in the step S4.

In the step S4, the fault detection is carried out in a manner substantially similar to that carried out by a conventional digital operation type relay. In this case, the arithmetic operation by, for instance, a distance relay, an undervoltage relay or a grounded voltage relay (an overvoltage relay which responds to zero sequence voltage) may be suitably applied depending upon the system used. The above-described arithmetic operation shall not be described in this specification because it is described in detail in, for instance, "HOGO KEIDEN KOGAKU (Protective Relay Technology) in the series of DENKI GAKKAI DAIGAKU KOZA (to be referred to as "reference literature 1" hereinafter in this specification) or "Computer Relaying", IEEE Tutorial Course (79 EHO148.7.PWR) (to be referred to as "reference literature 2" hereinafter in this specification).

In the step S7, the output command is delivered in order to limit the number of information data outputs to such an extent that the printing by a typewriter of the information data outputs may be satisfactorily permitted or the data transmission system may satisfactorily transmit the information data outputs without being overloaded. In this case, a predetermined time interval after the detection of a fault (for instance, one cycle), the step S7 is carried out. When necessary, the output command is delivered every one or a few cycles when a fault continues.

Next the arithmetic operation of information data carried out in the step S8 will be described. In this case, the information data output can be derived in various forms as shown in Eqs. (5)~(9), but in this embodiment, Eq. (5) is used. In Eq. (5), the reference voltage data $V_1 \sim V_{12}$ may be suitably used as the reference voltage $\dot{V}_P$ while the sample data $d_{0\text{-}1} \sim d_{0\text{-}12}$ may be suitably used as the data of the quantity of electricity $\dot{E}$ during a fault time interval. Information data of $V_PE \cos \theta$ and $V_PE \sin \theta$ are derived from, for instance, the following equation:

$$V_PE \cos \theta = \tfrac{1}{2}[v_1 d_{0\text{-}1} + d_4 d_{0\text{-}4}] \tag{13}$$

and $$V_PE \sin \theta = \tfrac{1}{2}[v_1 d_{0\text{-}4} - v_4 d_{0\text{-}1}] \tag{14}$$

In this case, however, the data $d_{0\text{-}1}$ and $d_{0\text{-}4}$ are computed according to the above-described equations for respective voltage data $e_1 \sim e_6$. That is, in response to the data corresponding to $e_1$, the above-described arithmetic operations are carried out and in a like manner, in response to the data corresponding to $e_2$, $e_3$, $e_4$, $4_5$ and $e_6$, the same operations are carried out.

Next the mode of operation of the first embodiment will be described. In the case of the normal operation of an electric power system, a fault detection in the step S4 is not carried out and the processing cycle consisting of the steps S2, S3, S4, S5, S6 and S11 is repeated in the order named. During this flow cycle, the sample data $d_{0\text{-}1} \sim d_{1\text{-}12}$ and the reference voltage data $v_1 \sim v_{12}$ are always renewed. No information data output is delivered.

When the electric-power system fails, a fault detection is carried out in the step S4 and the processing flow consisting of the steps S2, S3, S4, S7, S10 and S11 is first repeated. During this time, the sample data $d_{0\text{-}1} \sim d_{1\text{-}12}$ are sequentially renewed after the fault, but the reference voltage data $v_1 \sim v_{12}$ are processed according to Eq. (12) so that no new data is derived. When a conventional digital computer type relay is used, a fault detection is accomplished generally within a time interval shorter than one cycle after the occurrence of a fault, the reference voltage data $v_1 \sim v_{12}$ remain unchanged and are those stored prior to the occurrence of a fault.

While the fault continues or, for instance, one cycle after the detection of a fault, after one shift from the step S7 to the step S10, in response to the output command generated in the step S7, the process is changed to the flow consisting of the steps S7, S8, S9 and S10. This process change occurs each time when the output command is generated in the step S7. In response to this change in process, the processes according to Eqs. (13) and (14) are carried out in the step S8 so that in response to every case when $\dot{E}$ is represented in terms of Va, Vb, Vc, Ia, Ib and İc, respective values of $V_PE \cos \theta$ and $V_PE \sin \theta$ are computed and the results are delivered as information data in the step S9.

Eqs. (13) and (14) may be explained as follows. That is, the value of each data is an instantaneous value of a sinusoidal waveform and the effective values of $V_P$ and E can expressed by the following equation:

$$\left. \begin{aligned} v_1 &= \sqrt{2}\ V_p \sin(\omega t + \alpha + \pi/2) \\ v_4 &= \sqrt{2}\ V_p \sin(\omega t + \alpha) \\ d_{0-1} &= \sqrt{2}\ E \sin(\omega t + \theta + \alpha + \pi/2) \\ d_{0-4} &= \sqrt{2}\ E \sin(\omega t + \theta + \alpha) \end{aligned} \right\} \tag{15}$$

where
  $\omega$ is an angular velocity;
  t is time;
  $\alpha$ is an angle dependent upon a sampling time point; and
  $\pi$ is the circular constant.

The data $v_1$ and $d_{0\text{-}1}$ are the data sampled from $v_4$ and $d_{0\text{-}4}$, respectively, after $\pi/2$ while the data $v_1$ and $v_4$ are the data sampled from $d_{0\text{-}1}$ and $d_{0\text{-}4}$, respectively, before an integer multiple of a frequency and are defined as described above.

From Eq. (15), $$\left. \begin{aligned} v_1 d_{0-1} &= 2V_p E \sin(\omega t + \alpha + \pi/2)\sin(\omega t + \theta + \alpha + \pi/2) \\ &= V_p E \{\cos\theta - \cos(2\omega t + 2\alpha + \theta + \pi)\} \\ v_4 d_{0-4} &= 2V_p E \sin(\omega t + \alpha)\sin(\omega t + \theta + \alpha) \\ &= V_p E \{\cos\theta - \cos(2\omega t + 2\alpha + \theta)\} \end{aligned} \right\} \tag{16}$$

Hence, $$v_1 d_{0\text{-}1} + v_4 d_{0\text{-}4} = 2V_PE \cos\theta \tag{17}$$

so that Eq. (13) is obtained.
Furthermore, from Eq. (15), $$\left. \begin{aligned} v_4 d_{0-1} &= 2V_p E \sin(\omega t + \alpha)\sin(\omega t + \theta + \alpha + \pi/2) \\ &= V_p E \{\cos(\theta + \pi/2) - \cos(2\omega t + 2\alpha + \theta + \pi/2)\} \\ v_1 d_{0-4} &= 2V_p E \sin(\omega t + \alpha + \pi/2)\sin(\omega t + \theta + \alpha) \\ &= V_p E \{\cos(\theta - \pi/2) - \cos(2\omega t + 2\alpha + \theta + \pi/2)\} \end{aligned} \right\} \tag{18}$$

Hence, $$v_1 d_{0\text{-}4} - v_4 d_{0\text{-}1} = V_PE\{\cos(\theta - \pi/2) - \cos(\theta + \pi/2)\} = 2V_PE \sin\theta \tag{19}$$

so that Eq. (14) can be obtained.

In general, the magnitude of the reference voltage $V_P$ prior to the occurrence of a fault is obtained as information representative of the operation conditions of an electric-power system so that when the above-described information is obtained, the values of $E \cos\theta$ and $E \sin\theta$ are computed and consequently the magnitude of $\dot{E}$ and the phase angle $\theta$ in relation to the reference voltage $\dot{V}_P$ can be computed.

Furthermore, it is relatively easy to compute the magnitude of the reference voltage $V_P$ by the process described in a reference literature to be described hereinafter in the following modification of the present invention and to deliver the result as information data.

(Modification 1: Arithmetic operations of $V_PE \cos\theta$ and $V_PE \sin\theta$)

The above-described Eqs. (13) and (14) are merely one example for obtaining $V_PE \cos\theta$ and $V_PE \sin\theta$ and there are many arithmetic operations available for computing them. One example is shown below:

$$V_PE \cos\theta = v_1 d_{0-1} - v_2 d_{0-2} + v_3 d_{0-3} \quad (20)$$

$$V_PE \sin\theta = v_1 d_{0-2} - v_2 d_{0-1} \quad (21)$$

wherein $$\left.\begin{array}{l} v_2 = \sqrt{2}\, V_p \sin(\omega t + \alpha + \pi/3) \\ v_3 = \sqrt{2}\, V_p \sin(\omega t + \alpha + \pi/6) \\ d_{0-2} = \sqrt{2}\, E \sin(\omega t + \theta + \alpha + \pi/3) \\ d_{0-3} = \sqrt{2}\, E \sin(\omega t + \theta + \alpha + \pi/6) \end{array}\right\} \quad (23)$$

Hence, $$\left.\begin{array}{l} v_2 d_{0-2} = V_p E\{\cos\theta - \cos(2\omega t + 2\alpha + \theta + 2\pi/3)\} \\ v_3 d_{0-3} = V_p E\{\cos\theta - \cos(2\omega t + 2\alpha + \theta + \pi/3)\} \end{array}\right\} \quad (24)$$

From Eqs. (16) and (24), $$v_1 d_{0-1} + v_3 d_{0-3} = V_P E\{2\cos\theta - \cos(2\omega t + 2\alpha + \theta + 2\pi/3)\} \quad (25)$$

so that Eq. (20) is obtained from Eqs. (24) and (25). In addition, from Eqs. (15) and (23), $$\left.\begin{array}{rl} v_1 d_{0-2} &= 2V_p E \sin(\omega t + \alpha + \pi/3)\sin(\omega t + \theta + \alpha + \pi/2) \\ &= V_p E\{\cos(\theta + \pi/6) - \cos(2\omega t + 2\alpha + \theta + 5\pi/6)\} \\ v_2 d_{0-1} &= 2V_p E \sin(\omega t + \alpha + \pi/2)\sin(\omega t + \theta + \alpha + \pi/2) \\ &= V_p E\{\cos(\theta - \pi/6) - \cos(2\omega t + 2\alpha + \theta + 5\pi/6)\} \end{array}\right\} \quad (26)$$

Hence, $$v_1 d_{0-2} - v_2 d_{0-1} = V_P E\{\cos(\theta - \pi/6) - \cos(\theta + \pi/6)\} = V_P E \sin\theta \quad (27)$$

so that Eq. (21) can be obtained.

In addition to the above-described equations, there are other arithmetic operations for obtaining the values of $V_PE \cos\theta$ and $V_PE \sin\theta$ so that it is to be understood that the present invention is not limited to the above-described arithmetic operations.

(Modification 2: Output of $E \cos\theta$ and $E \sin\theta$)

The information data of the present invention is not limited to the above-described $V_PE \cos\theta$ and $V_PE \sin\theta$ and may use various modifications which will be described in detail hereinafter one by one.

After the magnitude of the reference voltage $\dot{V}_P$ is obtained, the following equations are solved with the results of the arithmetic operations of $\dot{V}_PE \cos\theta$ and $V_PE \sin\theta$ $$V_PE \cos\theta / V_P = E \cos\theta \quad (28)$$

and $$V_PE \sin\theta / V_P = E \sin\theta \quad (29)$$

and the values of $E \cos\theta$ and $E \sin\theta$ can be delivered as information data. $E \cos\theta$ and $E \sin\theta$ represent a real part and an imaginary part of the quantity of electricity $\dot{E}$ when each reference voltage is $\dot{V}_P$ and determine their phase angle relation.

The magnitude $V_P$ or $V_P^2$ (the square root of $V_P^2$ represents $V_P$) of the reference voltage is described in the first reference literature, page 112 and the second reference literature 2, pages 16–23 so that no further description shall be made in this specification.

(Modification 3: Output of $(E/V_P)\cos\theta$ and $(E/V_P)\sin\theta$)

After $V_P^2$ is obtained by the processes described in the above-described reference literatures, the following equations are solved $$V_PE \cos\theta / V_P^2 = E \cos\theta / V_P \quad (30)$$

and $$V_PE \sin\theta / V_P^2 = E \cos\theta / V_P \quad (31)$$

so that the information data are in the form of $(E \cos\theta)/V_P$ and $(E \sin\theta)/V_P$. As in the case in which $V_PE \cos\theta$ and $V_PE \sin\theta$ are used as information data, the information data obtained in the manner described above can be used to compute the magnitude $\dot{E}$ of the quantity of electricity and the phase angle in relation to the reference voltage $\dot{V}_P$.

(Modification 4: Output of $\sin\theta$ (or $\cos\theta$) and $\tan\theta$ (or $\cot\theta$)

The information data can obtain $\cos\theta$ and $\sin\theta$ by obtaining the effective value E of the quantity of electricity $\dot{E}$ during a fault time interval in accordance with the process described in the reference numeral cited in Modification 2 and dividing Eq. (28) or (29) by E and $\tan\theta$ and $\cot\theta$ of the phase angle $\theta$ can be obtained from the following equation:

$$\tan\theta = V_PE \sin\theta / V_PE \cos\theta \quad (32)$$

and $$\cot\theta = V_PE \cos\theta / V_PE \sin\theta \quad (33)$$

Both $\tan\theta$ and $\cot\theta$ may be delivered as information data, but one of them may be delivered by the following processes:

(a) When $V_PE \sin\theta \leq V_PE \cos\theta$, $\tan\theta$ is obtained from Eq. (32) and delivered as an output and (b) when $V_PE \sin\theta > V_PE \cos\theta$, $\cot\theta$ is obtained from Eq. (33) and delivered as an output.

Whether $\tan\theta$ or $\cot\theta$ is delivered can be detected in response to a code bit.

When $\cos\theta$ (or $\sin\theta$) and $\tan\theta$ (or $\cot\theta$) obtained in the manner described above are delivered as information data, the angle $\theta$ of the quantity of electricity E in relation to the reference voltage $V_P$ can be obtained.

(Modification 5: Output of $\theta$)

Since $\cos\theta$ (or $\sin\theta$) and $\tan\theta$ (or $\cot\theta$) can be obtained in the manner described above in Modification 4, the phase angle $\theta$ can be obtained from the trigonometric function table stored in a memory.

(Modification 6: System for detecting a command device)

Figure 3:
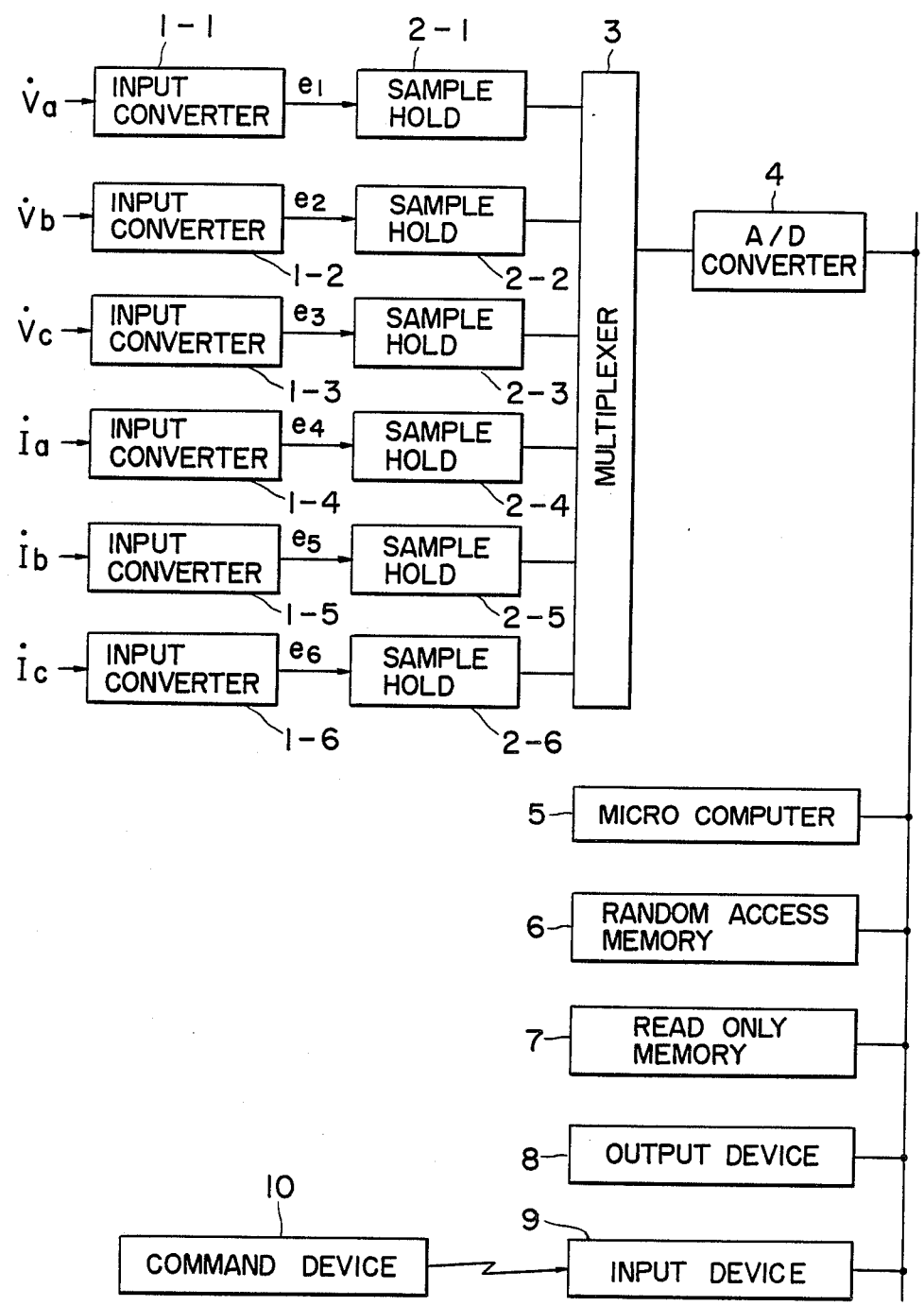
FIG. 3 shows the construction of a second embodiment of the present invention.

FIG. 3 shows the construction of a second embodiment of the present invention and the same reference numerals are used to designate similar parts throughout FIGS. 1 and 3. Reference numeral 9 designates an input device and 10, a command device. The input device is substantially similar to that used in the conventional computers and causes a computer to execute a process in response to an externally delivered command signal. The command device 10 is disposed outside or at a remote site. In most cases, the commands from the command device 10 are transmitted through a transmission system such as a microwave communication network or an optical communication network which is not shown for the sake of simplicity.

Figure 5:
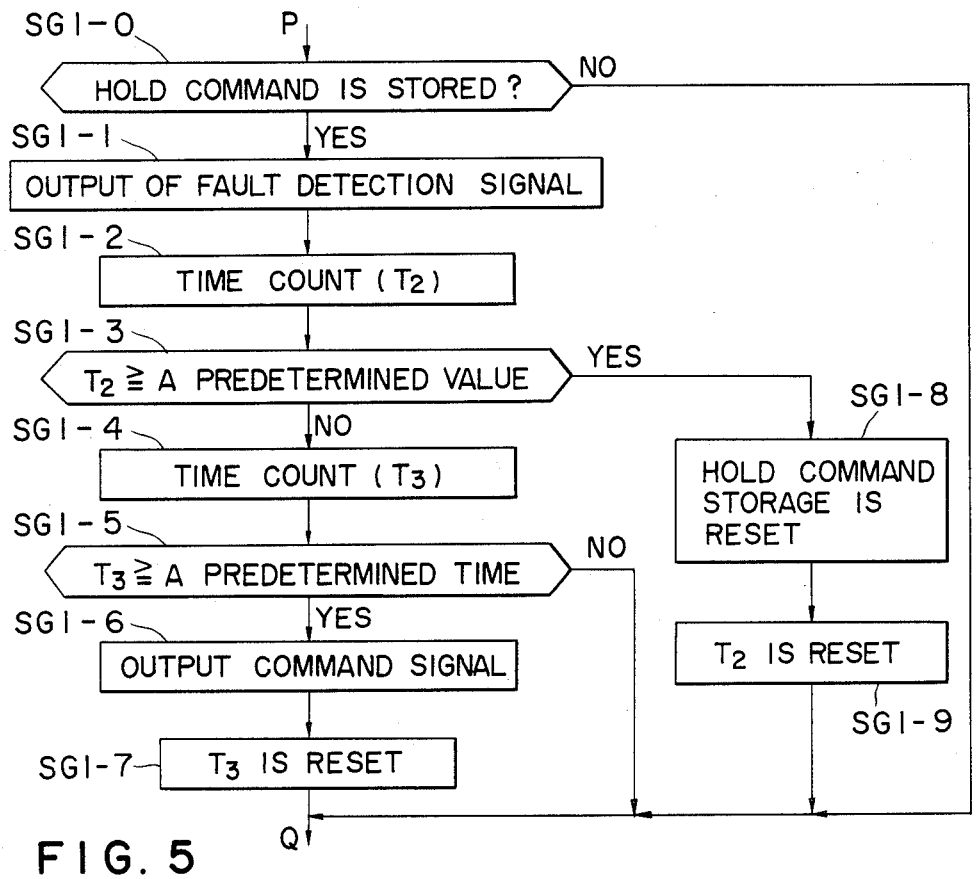
FIG. 5 shows in detail a part of the flowchart shown in FIG. 4.

The command device 10 is substantially similar in construction to that shown in FIG. 1 so that its construction is not shown. One example of the process flow of the command device 10 will be described with reference to FIG. 4 in which the steps similar to those shown in FIG. 2 are designated by the same symbols. As in the case of FIG. 2, the steps S1, S2 and S3 are carried out and if a predetermined time interval has not elapsed since the process has been started, the process proceeds to the step S11 so that the sample data is rewritten according to Eq. (10). When a predetermined time interval after the process has been started has already elapsed, the fault detection is carried out in the step S4 as in the case of FIG. 1. If no fault is found, a process in the case of no fault is carried out in the step SG1 which is shown in detail in FIG. 5 and then the step S11 is carried out. The step SG1 will be described in detail below.

When a fault is detected, the fault detection signal is generated in the step S12 and whether the hold command is stored or not is detected in the step S13. If no hold command is stored, the hold command is stored in the step S14. Next time counter ($T_1$) is carried out in the step S15. When the hold command is stored, the step S14 is skipped.

After the time count $T_1$ in the step S15, the process proceeds to the step S16 so as to detect whether or not the counted value $T_1$ reaches a predetermined value. If the counted value $T_1$ is less than a predetermined value, the process proceeds to the step S11. If the counted value $T_1$ reaches a predetermined value, the output command signal is generated in the step S17 and the counted value $T_1$ is reset to 0 in the step S18. Thereafter the process shifts to the step S11. After the step S11 is carried out, the process shifts back to the step S2 and the same process is repeated. When a fault is detected, the fault detection signal is generated during the time when the fault detection is carried out and every time when the time counted value T1 reaches a predetermined value, the output command signal is transmitted.

After the recovery of a fault, no fault detection is carried out in the step S4 and the process proceeds to the step SG1. The process in the step SG1 will be described in detail with reference to FIG. 5. First, in the step SG1-0, whether the hold command stored in the step S14 is still stored or not is detected. Immediately after a fault is detected in the step S4 and then is remedied, the hold command remains stored so that after the fault detection signal is generated in the step SG1-1, the process shifts to the step SG1-2 to count time $T_2$. In the step SG1-3, whether or not the counted value $T_2$ reaches a predetermined value is detected. If the counted value $T_2$ is less than a predetermined value, the process shifts to the step SG1-4 in which time count $T_3$ is carried out and in the step SG1-5, whether or not the counted value $T_3$ reaches a predetermined value. If the counted value $T_3$ is less than a predetermined value, the process shifts to the step S11 in FIG. 11 after the processing of step SG-1 has been accomplished.

When the fault has been recovered and no further fault occurs, the step SG-1 is carried out again after the steps S11, S2, S3 and S4 in FIG. 4 have been carried out. In this case, neither of the counted values $T_2$ and $T_3$ are less than a predetermined value, the process is repeated in the same manner as described above. After the process has been repeated, the count value $T_3$ reaches a predetermined value (a predetermined value for counted value $T_2$ is by far higher than a predetermined value for counted value $T_3$). Therefore, after the step SG1-5 has been carried out, the output command signal is generated in the step SG1-6 and the counted value $T_3$ is reset to 0 in the step SG1-7. In this manner, whenever the count value $T_3$ reaches its predetermined value, the output command signal is generated. When the process is repeated in this manner, the count value $T_2$ reaches its predetermined value and is detected in the step SG1-3. Then the storage of the hold command is reset in the step SG1-8 and then the count value $T_2$ is reset to 0 in the step SG1-9. When the storage of the hold command has been reset, it is detected in the step SG1-1 so that no further process is carried out.

As described above, before the time count $T_2$ reaches a predetermined value after the recovery of the fault, the fault detection signal is generated and every time when the time count $T_3$ reaches its predetermined value, the output command signal is delivered.

The input device 9 shown in FIG. 3 receives the fault detection signal and the output command signal delivered from the command device 10 and transmits the signal reception conditions to the microcomputer 5. In the microcomputer 5, the process is not carried out in response to the fault detection in the step S4, but is carried out depending upon whether the fault detection signal is received or not. Furthermore the output command in the step S7 is processed whether or not the output command signal is received. All other processes are substantially similar to those described above with reference to FIG. 2.

As described above, in the second embodiment, the command device is provided independently; the information data output device receives the fault detection signal derived from the command device to store the data of the reference voltage $\dot{V}_P$ and in response to the reception of the output command signal, delivers the information data. Furthermore, in the second embodiment, the period of the information data output during the fault period is dependent upon time count $T_1$ while the period of the information data output after the recovery of the fault is dependent upon time count $T_3$. For instance, the period is 0.0167~0.04 seconds during the fault period and becomes 0.1~0.2 seconds after the recovery of the fault. This corresponds to the fact that, in general, a fault is interrupted within 0.1 seocnd and that after the recovery of the fault, the power fluctuates at a period of, for instance, one second. As described above, the second embodiment has the advantage that the information data output period may be suitably varied during or after recovery of a fault.

Figure 6:
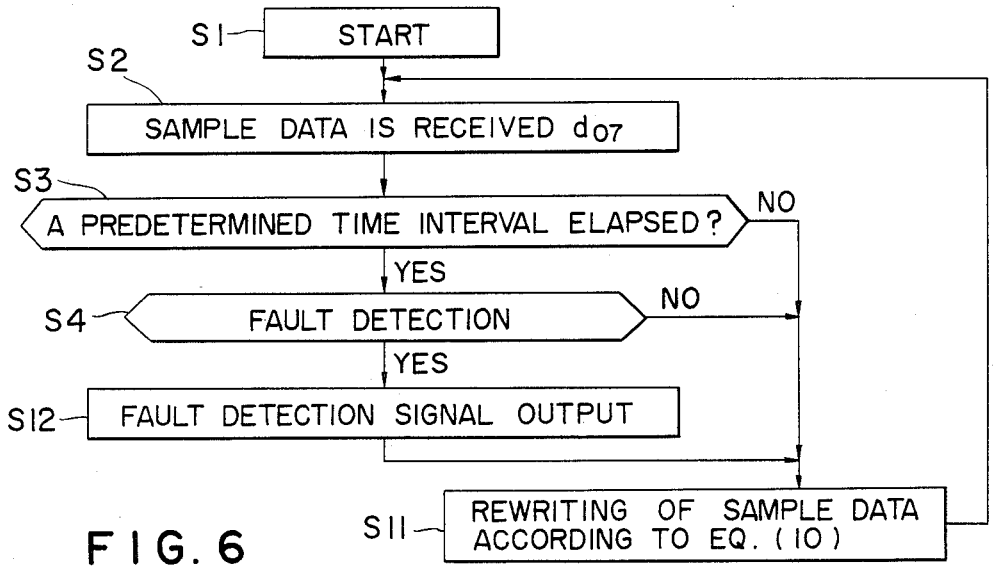
FIG. 6 is a flowchart used to explain a further mode of operation of the second embodiment shown in FIG. 4.

In FIG. 4, the command device delivers both the fault detection signal and the output command signal, but it is also possible to derive only the fault detection signal therefrom as will be described below with reference to FIG. 6. Same symbols and numerals are used to designate similar parts in FIGS. 2, 4 and 6. After the initialization has been accomplished and a predetermined time interval has been measured in the step S3, if a fault is detected in the step S4, the fault detection signal is generated in the step S12. As soon as the fault has been eliminated, the fault detection signal is interrupted.

Figure 7:
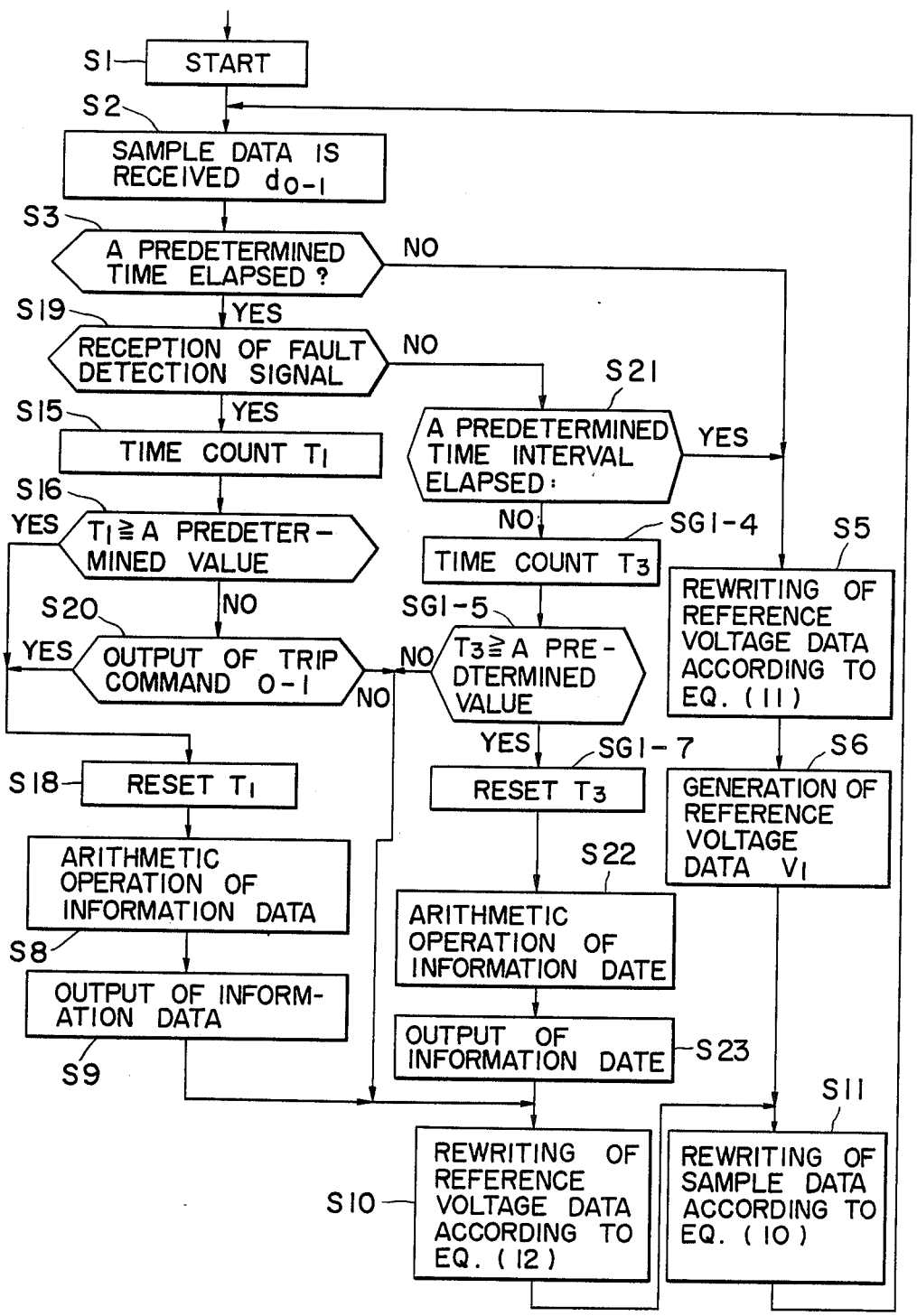
FIG. 7 is a flowchart used to explain the operation mode of the second embodiment.

FIG. 7 shows one example of the processing accomplished by the information data output device when no command device is utilized. The same numerals and symbols are used to designate through FIGS. 2, 4, 5 and 7 and only the processes different from those shown in FIG. 2 will be described. After a predetermined time interval has been measured in the step S3, the process proceeds to the step S19 and when the fault detection signal is not received in the step S19, the process shifts to the step S21. Except a time interval $T_2$ after the received fault detection signal disappears, the reference voltage data are rewritten in accordance with Eq. (11) in the step S5, the reference voltage data $v_1$ is generated in the step S6, the sample data are rewritten according to Eq. (10) in the step S11, and the sample data $d_{0-1}$ is obtained in the step S2. Thereafter the process shifts to the step S3. As far as no fault detection signal is received, the above-described process is cycled.

Upon reception of the fault detection signal, the process shifts from the step S19 to the step S15 to count time $T_1$. When the time count $T_1$ reaches a predetermined value, it is reset to 0 in the step S18. As in the case of FIG. 2, the information data is computed in the step S9. However, if time count $T_1$ is less than a predetermined value, the process shifts to the step S20 to detect whether or not there exists a trip signal applied to a circuit breaker from protection relays. If the appearance of the trip signal is detected, the steps S18, S8 and S9 are carried out in a manner substantially similar to that described above. When no trip signal is detected in the steps S16 and S20, these processes are not carried out. When the fault signal is received in the step S19, regardless of the fact that the steps S18, S8 and S9 have been carried out or not, the process shifts to the step S10 to rewrite the reference voltage data according to Eq. (12) and then the steps S11 and S2 are carried out. Thereafter the process shifts back to the step S3. As long as the fault detection signal is received continuously, the above-described processes are cycled.

Until a time interval $T_2$ is elapsed after the fault detection signal has disappeared, the steps S19 and S21 are carried out sequentially and then the step SG1-4 is carried out to count time $T_3$. In the step SG1-5, whether or not the count value reaches a predetermined value is detected. If the count value reaches a predetermined value, it is reset to 0 in the step SG1-7 and in the step S22 the arithmetic operation of the information data is accomplished and the result is delivered in teh step S23. On the other hand, if the time count value $T_3$ is still less than a predetermined value, the steps SG1-7, S22 and S23 are not carried out. In either case, these processes are followed by the rewriting of data in the steps S10, S11 and S2 and the process returns to the step S3.

As described above, in the third embodiment described above with reference to FIG. 7 in response to the reception of the fault detection signal, the process for rewriting the reference voltage data is shifted from the steps S5 and S6 to the step S10 so that the data during a predetermined time interval from the reception of the fault detection signal can be held. As a result, the reference voltage data prior to the occurrence of a fault can be held for a predetermined time interval $T_2$ after the disappearance of the fault detection signal.

Furthermore, while the fault detection signal is being received, at each predetermined value of time $T_1$ recount and at the instant when the trip command signal is applied to the circuit breaker, the information data is delivered. When the fault detection signal disappears, before a predetermined time interval $T_2$ is elapsed after the disappearance of the fault detection signal, the information data is delivered every time when time $T_3$ is counted up to a predetermined value.

As described above, the information output device is so designed and constructed so as not to incorporate therein a fault detection device, but to receive the fault detection signal from the outside and to store the sample data of the reference voltage $\dot{V}_P$ upon reception of the fault detection signal, whereby the objects of the pesent invention can be attained in the same manner.

(Modification 7: Reference voltage $\dot{V}_P$ and the quantity of electricity E)

In the first embodiment described above with reference to FIG. 1, the reference voltage $\dot{V}P$ is, for instance, an a-phase to ground voltage $\dot{V}a$ or the voltage $\dot{V}a - \dot{V}b$ between the phases a and b, but other various voltages may be used as a reference voltage $\dot{V}_P$. For instance, the phase to ground voltage in each phase, each interphase voltages and composite voltages of phase to ground voltages can be used as a reference voltage $\dot{V}_P$. Before the occurrence of a fault, the voltages in three phases are substantially balanced with each other so that unless a negative sequence voltage or a zero sequence voltage whose value is extremely small normally, the operation is not adversely affected at all when any voltage is used.

In general, the voltage or current in each phase is used as the quantity of electricity E. It is also possible to use the sum of the voltages or currents in two or three phases (three times the zero sequence value) as the quantity of electricity depending upon a desired purpose. Furthermore, when the data concerning to stability is especially needed, only a positive sequence voltage and a positive sequence current may be derived as data so that the amount of output data may be minimized.

One example of the processes for delivering a positive sequence voltage data will be described. When the quantity of electricity $\dot{E}$ is an a-phase reference positive sequence voltage $\dot{V}a1$, $V_P Va1 \cos \theta$ and $V_P Va1 \sin \theta$ of Eq. (5) may be obtained by, for instance, the following equations:

$$V_P Va1 \cos \theta = \tfrac{1}{3}[v_3 d_{0-3(val)} + v_6 d_{0-6(val)}] \quad (34)$$

$$V_P Va1 \sin \theta = \tfrac{1}{3}[v_3 d_{0-6(val)} - v_6 d_{0-3(val)}] \quad (35)$$

where $$d_{0-3(val)} = \tfrac{1}{3}[d_{0-1(vc)} + d_{0-3(va)} - d_{0-5(vb)}] \quad (36)$$

$$d_{0-6(val)} = \tfrac{1}{3}[-d_{0-4(vc)} + d_{0-6(va)} - d_{0-8(vb)}] \quad (37)$$

$d_{0-3(val)}$ and $d_{0-6(val)}$ are sampled values if each $\dot{V}a1$ is directly sampled at the same time points at which the data $d_{0-3}$ and $d_{0-6}$ are sampled; $-d_{0-1(vc)}$ and $-d_{0-4(vc)}$ are data of the voltage $\dot{V}c$ in the sample data $d_{0-1}$ and $d_{0-4}$, respectively; $d_{0-3(va)}$ and $d_{0-6(va)}$ are the data of the voltages in respective data sample $d_{0-3}$ and $d_{0-6}$, respectively; and $d_{0-5(vb)}$ and $d_{0-8(vb)}$ are the data of the voltages $V_b$ in respective sample data of $d_{0-5}$ and $d_{0-8}$.

When Vp, Va, Vb and Vc are effective values, the respective data are obtained from the following equations:

$$\left.\begin{aligned}
v_3 &= \sqrt{2}\ V_p\sin(\omega t + \alpha + \pi/6) \\
v_6 &= \sqrt{2}\ V_p\sin(\omega t + \alpha - \pi/3) \\
d_{0-3(va)} &= \sqrt{2}\ Va\sin(\omega t + \alpha + \theta_a + \pi/6) \\
d_{0-6(va)} &= \sqrt{2}\ Va\sin(\omega t + \alpha + \theta_a - \pi/3) \\
d_{0-5(vb)} &= \sqrt{2}\ Vb\sin(\omega t + \alpha + \theta_b - \pi/6) \\
d_{0-8(vb)} &= \sqrt{2}\ Vb\sin(\omega t + \alpha + \theta_b - 2\pi/3) \\
d_{0-1(vc)} &= \sqrt{2}\ Vc\sin(\omega t + \alpha + \theta_c + \pi/2) \\
d_{0-4(vc)} &= \sqrt{2}\ Vc\sin(\omega t + \alpha + \theta_c)
\end{aligned}\right\} \quad (38)$$

where $\theta_a$, $\theta_b$ and $\theta_c$ are phase angles, respectively, in relation to $\dot{V}_P$ of $\dot{V}a$, $\dot{V}b$ and $\dot{V}c$.

Hence $$\left.\begin{aligned}
-d_{0-1(vc)} &= \sqrt{2}\ Vc\sin(\omega t + \alpha + \theta_c + \pi/6 - 2\pi/3) \\
-d_{0-5(vb)} &= \sqrt{2}\ Vc\sin(\omega t + \alpha + \theta_b + \pi/6 + 2\pi/3)
\end{aligned}\right\} \quad (39)$$

Therefore, $$d_{0-3(val)} = \sqrt{\tfrac{2}{3}}[Va\sin(\omega t+\alpha+\theta_a+\pi/6)+Vb\sin(\omega t+\alpha+\theta_b+\pi/6+2\pi/3)+Vc\sin(\omega t+\alpha+\theta_c+\pi/6-2\pi/3)] \quad (40)$$

Because of the following relation $$\dot{V}al = \tfrac{1}{3}(\dot{V}a + \dot{V}b e^{j120°} + \dot{V}c e^{-j120°}) \quad (41)$$

we obtain $$d_{0-3(val)} = \sqrt{2}\,Val\sin(\omega t+\alpha+\theta_{al}+\pi/6) \quad (42)$$

where $\theta_{al}$ is the phase angle of $\dot{V}al$ in relation to $\dot{V}p$.
Furthermore, $$\left.\begin{aligned}
-d_{0-4(vc)} &= \sqrt{2}\ Vc\sin(\omega t + \alpha + \theta_c - \pi/3 - 2\pi/3) \\
-d_{0-8(vb)} &= \sqrt{2}\ Vc\sin(\omega t + \alpha + \theta_b - \pi/3 + 2\pi/3)
\end{aligned}\right\} \quad (43)$$

Hence, $$d_{0-6(val)} = \sqrt{\tfrac{2}{3}}[Va\sin(\omega t+\alpha+\theta_a-\pi/3)+Vb\sin(\omega t+\alpha+\theta_b-\pi/3+2\pi/3)+Vc\sin(\omega t+\alpha+\theta_c-\pi/3-2\pi/3)] \quad (44)$$

Therefore, from Eq. (41), we obtain $$d_{0-6(val)} = \sqrt{2}\,Val\sin(\omega t+\alpha+\theta_{al}-\pi/3) \quad (45)$$

From $V_3$ and $V_6$ obtained from Eq. (38) and Eqs. (42) and (45), we have $$V_3 d_{0-3(val)} = V_P Val\{\cos\theta_{al} - \cos(2\omega t+2\alpha+\theta_{al}+\pi/3)\} \quad (46)$$

$$V_6 d_{0-6(val)} = V_P Val\{\cos\theta_{al} - \cos(2\omega t+2\alpha+\theta_{al}-2\pi/3)\} \quad (47)$$

Hence, $$V_3 d_{0-3(val)} + V_6 d_{0-6(val)} = 2V_P Val\cos\theta_{al} \quad (48)$$

Since $$V_3 d_{0-6(val)} = V_P Val\{\cos(\theta_{al}-\pi/2) - \cos(2\omega t+2\alpha+\theta_{al}-\pi/6)\} \quad (49)$$

$$V_6 d_{0-3(val)} = V_P Val\{\cos(\theta_{al}+\pi/2) - \cos(2\omega t+2\alpha+\theta_{al}-\pi/6)\} \quad (50)$$

Hence, $$V_3 d_{0-6(val)} - V_6 d_{0-3(val)} = 2V_P Val\sin\theta_{al} \quad (51)$$

Therefore, $V_P Val\cos\theta$ and $V_P Val\sin\theta$ can be derived from Eqs. (34) and (35).

A positive phase voltage may be also used as a reference voltage $\dot{V}_P$. In this case, since the data $d_{0-3(val)}$ obtained from Eq. (36) is a sampled value of the positive sequence voltage $Val$ at the sampling time point of the sample data $d_{0-3}$, when the data which is sequentially shifted is used as a reference voltage data, the information data in which a positive sequence voltage $\dot{V}al$ prior to the occurrence of a fault is a reference voltage $\dot{V}_P$ is obtained.

In the above-described embodiments, the voltage of an electric station for obtaining the information data concerning the quantity of electricity $\dot{E}$ (to be referred to as "data-obtaining electric station" hereinafter in this specification) is used as a reference voltage $\dot{V}_P$, but the reference voltage $\dot{V}_P$ may be a voltage at a specific point on a transmission line extended from the data-obtaining electric station which is obtained by a simulation according to the following equation:

$$\dot{V}_P = \dot{A}\dot{V}_s - \dot{Z}\dot{I}_s \quad (52)$$

where $\dot{V}_s$ is a voltage at a data-obtaining electric station,
$\dot{I}_s$ is a current flowing through a transmission line extended from the data-obtaining electric station, and
$\dot{A}$ and $\dot{Z}$ are transmission line constants between the electric station and a specific point J on the transmission line extended from the station.

In this embodiment, the sampled value of the voltage $\dot{V}_P$ expressed in Eq. (52) is computed from the sampled values of the voltages $Vs$ and the current $Is$ and is used as a sampled value of the reference voltage $\dot{V}_P$.

This embodiment can be carried out only by changing the generation of the reference voltage data $v_1$ in the step S6 in FIG. 2 or 7. The reference voltage data $v_1$ is obtained by the following equation:

$$v_1 = A_r V_{s(1-12)} + A_i V_{s(1-9)} - (Z_r I_{s(1-12)} + Z_i I_{s(1-9)}) \quad (53)$$

where $A_r$ and $Z_r$ are real parts of the constants $\dot{A}$ and $\dot{Z}$, respectively, and $A_i$ and $Z_i$ are imaginary parts thereof, respectively. Their relations are expressed by the following equations:

$$\left.\begin{array}{l}\dot{A} = Ar + jAi \\ \dot{Z} = Zr + jZi\end{array}\right\}(54)$$

Furthermore, $\dot{V}_{s(1-12)}$, $\dot{I}_{s(1-12)}$, $\dot{V}_{s(1-9)}$ and $\dot{I}_{s(1-9)}$ are data of the voltage $\dot{V}s$ and the current $\dot{I}s$ of the data $d_{1-12}$ and $d_{1-9}$. The voltage $\dot{V}s$ and the current $\dot{I}s$ may be those in various phases of three phases. For instance, when the voltage difference $\dot{V}a - \dot{V}b$ between the phases a and b is used as $\dot{V}s$, the current difference $\dot{I}a - \dot{I}b$ between the phases a and b is also used as $\dot{I}s$. The data $\dot{V}_{s(1-12)}$, $\dot{V}_{s(1-9)}$, $\dot{I}_{s(1-12)}$ and $\dot{I}_{s(1-9)}$ are derived by obtaining the difference between the data of the a-phase current $\dot{I}a$ and the b-phase current $\dot{I}b$. In addition, the voltage $\dot{V}s$ and $\dot{I}s$ may be various voltages and currents such as the a-phase voltage $\dot{V}a$ and the a-phase current $\dot{I}a$, the positive sequence voltage $\dot{V}a1$ and the positive sequence current $\dot{I}a1$ in the a-phase reference and so on. In this case, the sampled values of the positive phase voltage $\dot{V}a1$ and the positive phase current $\dot{I}a1$ in the a-phase reference can be obtained by adding the data sampled at different time points as in the case of Eq. (36).

The data $v_1$ thus obtained is sequentially rewritten in the step S5 according to Eq. (11) and is delivered as the data of the reference voltage $\dot{V}_P$ as in the case of the embodiment described above with reference to FIGS. 2 or 7.

Next Eq. (53) will be explained. The product terms $ArV_{s(1-12)}$ and $ZrI_{s(1-12)}$ are equal to the sampled values of the products $Ar\dot{V}s$ and $Zr\dot{I}s$ obtained at a sampling time (to be referred as "time 1-12" hereinafter in this specification) of the data $v_{1-12}$. The sampling time of the data $V_{s(1-9)}$ and $I_{s(1-9)}$ lags behind the time 1-12 by 90°. Therefore the data $V_{s(1-9)}$ and $I_{s(1-9)}$ are equal to the values obtained by sampling the voltage $j\dot{V}s$ and $j\dot{I}s$ at the time 1-12. Hence, the products $AiV_{s(1-9)}$ and $ZiI_{s(1-9)}$ are equal to the values, respectively, obtained by sampling the products $jAi\dot{V}s$ and $jZi\dot{I}s$ at the time 1-12.

In view of the above, the value of Eq. (53) becomes $$\begin{aligned} v_1 &= \text{the value obtained by sampling } (Ar\dot{V}s + jAj\dot{V}s - (Zr\dot{I}s + jZi\dot{I}s)) \text{ at the time 1-12 and} \\ &= \text{the value obtained by sampling } (\dot{A}\dot{V}s - \dot{Z}\dot{I}s) \text{ at the time 1-12} \end{aligned} \quad (55)$$

Therefore, the data $v_1$ obtained from Eq. (53) is equal to the value obtained by sampling the reference voltage $\dot{V}_P$ expressed in Eq. (52) at the time 1-12.

In case of a conventional transmission line in which the influence due to the charged current of the transmission line is negligible, it is impossible to assume that $\dot{A} \approx 1$ so that the data $v_1$ is obtained from Eq. (53) on the assumption that $Ar=1$ and $Aj=0$.

Figure 10:
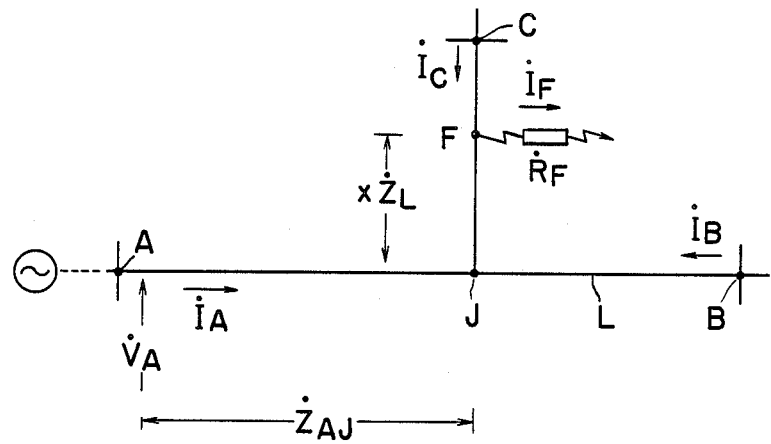
FIG. 10 is a view used to explain the problem encountered when the measurement of a distance to a fault point is made on a transmission line having three terminals.

The effect attained by using the voltage $v_1$ obtained by Eq. (53) as a reference voltage will be described. In is assumed that the present embodiment is applied to the transmission line with three terminals A, B and C as shown in FIG. 10. In this case, the voltage $\dot{V}s$ and the current $\dot{I}s$ obtained by Eq. (52) at the electric station at the terminal A are used as the voltage $\dot{V}_A$ and the constants $\dot{A}$ and $\dot{Z}$ are assumed to be the constants between the terminal A and the junction J (for instance, $\dot{A}=1$ and $\dot{Z}=Z_{AJ}$). Then, according to Eq. (52), the reference voltage $\dot{V}_P$ represents a simulated voltage at the junction J prior to the occurrence of a fault. In like manner, at the electric stations at the terminals B and C, Eq. (52) is used to simulate a voltage at the junction J so that the reference voltage $\dot{V}_P$ simulating a voltage prior to the occurrence of a fault can be obtained.

When the Eq. (52) is used in the manner described above, the reference voltage $\dot{V}_P$ becomes equal in all the electric stations at the terminals A, B and C. It follows therefore that all the information data delivered from all the electric stations becomes the data based on the same reference voltage so that the information data from which the phase relations of the quantity of electricity $\dot{E}$ between different electric stations can be easily detected and obtained.

Figure 8:
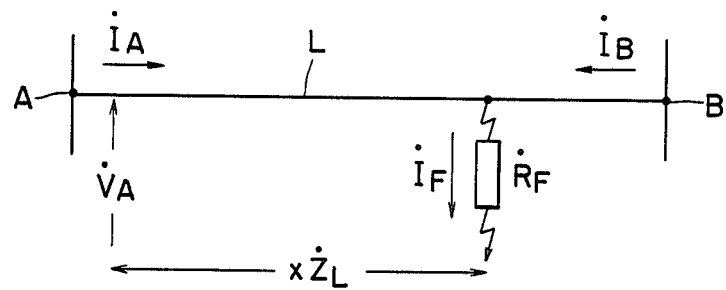
FIG. 8 is a view used to explain the principle for measuring a distance to a fault point on a two-terminal transmission line.
Figure 9:
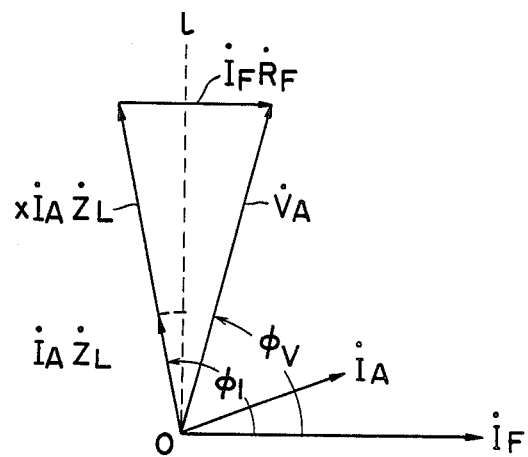
FIG. 9 is a vector diagram used to explain the problem encountered when the measurement of a distance to a fault point in the system shown in FIG. 8 is made.

In case of the two-terminal transmission line as shown in FIG. 8, the present embodiment may be applied only to one electric station at one terminal A or B so that the reference voltage $\dot{V}_P$ can be made equal in both the electric stations at the terminals A and B. That is, when the constants $\dot{A}$ and $\dot{J}$ of Eq. (52) are used as the constants of the transmission line L between its terminals A and B and the present embodiment is applied, the reference voltage $\dot{V}_P$ in the electric station at the terminal A becomes a voltage which simulates a voltage in the electric station at the terminal B prior to the occurrence of a fault.

As described above, according to this embodiment, the sampled value of the reference voltage $\dot{V}_P$ is represented by the sampled value of the voltage simulating the voltage at a specific point J on the transmission line according to Eq. (52) so that the electric stations at all the terminal of one transmission line have the same reference voltage $\dot{V}_P$. As a result, the information data based on the same reference voltage are delivered from all the electric stations.

As in the cases of other embodiments, it is advantageous to select the sampled value of the reference voltage $\dot{V}_P$ from a value immediately before the occurrence of a fault. That is, the voltage at a specific point J according to Eq. (52) can be simulated only when a transmission line breaker inserted between one terminal and a specific point J is closed and no fault occurs therebetween. In most cases, the voltage obtained after the occurrence of a fault cannot be used to simulate the voltage at a specific point J because a fault occurs between one terminal and a specific point J or because the transmission line is interrupted.

The present invention has an advantage to obtain the information data from which the relative phase angles of the quantity of electricity among a plurality of electric stations during a fault time interval or after the recovery of a fault in an electric-power system only by delivering simple information data without transmitting a large amount of instantaneous waveforms of voltage or current by a PCM or frequency modulation transmission system at a high speed.

What is claimed is:

1. A method for obtaining information data in the form of a digital data obtained from an electric power system through detection of a fault in the system, comprising the steps of:

initiating an operation of fault detection;
   judging whether or not a predetermined time has passed since initiating the operation of fault detection;
   sampling data from said electric power system a predetermined number of times for each cycle of an electric quantity of said electric power system so as to produce sampled data successively;

rewriting a reference voltage data by another reference voltage data produced from the sampled data until said predetermined time has passed;
detecting a fault from the sampled data when said predetermined time has passed;
judging whether or not an output command exists when the fault is detected;
computing information data according to a predetermined formula when the output command exists,
outputting the result obtained by computation according to the output command;
rewriting the reference voltage data by another reference voltage data produced from the sampled data;
rewriting the sampled data by a new sampled value; and
repeating the steps above-mentioned in sequence.

2. The method of claim 1, wherein said first sampled data representing a reference voltage $\dot{V}p$ is obtained from a specific point J on a transmission line through simulation based on a voltage $\dot{V}s$ at an electric station for obtaining an information data concerning a quantity of electricity E, a current is flowing through said transmission line extended from said electric station and constants $\dot{A}$ and $\dot{Z}$ of said transmission line between said specific point J on said transmission line and said electric station according to the following equation $$\dot{V}p = \dot{A}\dot{V}s - \dot{Z}\dot{I}s.$$

3. The method of claim 1, wherein a first sampled data before a fault occurs and a second sampled data after the fault occurred, obtained from the electric power system, are used to deliver the information data of at least a phase angle J between the first and second sampled data.

4. The method of claim 3, wherein said first sampled data represents a reference value, and said second sampled data represents detected quantity of electricity.

5. The method of claim 3, wherein said first sampled data represents a value immediately before the occurrence of a fault detected by a fault detection.

6. The method of claim 3, wherein one of said sampled data specifying said phase angle J includes sin J while the other includes cos J.

7. A method of claim 3, wherein one of said sampled data specifying said phase angle J includes cos J or sin J while the other includes tan J or cot J, respectively.

8. A method for outputting information data in the form of a digital data obtained from an electric power system through detection of a fault in the system, comprising the steps of:
initiating an operation of fault detection; judging whether or not a predetermined time has passed since initiating the operation of fault detection;
sampling data from said electric power system a predetermined number of times for each cycle of an electric quantity of said electric power system so as to produce sampled data successively;
rewritting a reference voltage data by another reference voltage data produced from the sampled data until said predetermined time has passed;
detecting a fault from the sampled data when said predetermined time has passed;
storing a hold command when the fault is detected;
outputting the sampled data obtained within a second predetermined time after the fault is detected;
periodically outputting the sampled data for a third predetermined time after said second predetermined time;
resetting the hold command after the third predetermined time has passed;
rewriting the sampled data by a new sampled value; and
repeating the steps above-mentioned in sequence.

9. A method for outputting information data in the form of a digital data obtained from an electric power system through detection of a fault in the system, comprising the steps of:
initiating an operation of fault detection; judging whether or not a predetermined time has passed since initiating the operation of fault detection;
sampling data from said electric power system a predetermined number of times for each cycle of an electric quantity of said electric power system so as to produce sampled data successively;
rewriting a reference voltage data by another reference voltage data produced from the sampled data until said predetermined time has passed;
receiving a fault detection signal; computing
information data after a second predetermined time passes since the reception of the fault detection signal;
outputting the result obtained by the computation;
periodically computing information data for a third predetermined time following the fault detection signal;
periodically outputting a result obtained by the computation during the third predetermined time;
rewriting the reference voltage data by another reference voltage data produced from the sampled data when said result is outputted;
rewriting the sampled data by a new sampled value; and
repeating the steps above-mentioned in sequence.

10. A device for outputting information data in the form of a digital data obtained from an electric power system through detection of a fault in the system comprising:
initiating means for initiating an operation of fault detection;
operation judging means for judging whether or not a predetermined time passes since initiating the operation of fault detection;
sampling means for sampling data from said electric power system a predetermined number of times for each cycle of an electric quantity of said electric power system so as to produce sampled data successively;
reference data rewriting means for rewriting a reference data by another reference voltage data produced from the sampled data until said predetermined time passes;
detecting means for detecting a fault from the sampled data when said predetermined time passes;
command judging means for judging whether or not an output command exists when the fault is detected;
computing means for computing information data according to a predetermined formula when the output command exists;
outputting means for outputting a result obtained by computation according to the output command; and
sampled data rewriting means for rewriting the sampled data by a new sampled data.

11. A device for outputting information data in the form of a digital data obtained from an electric power system through detection of a fault in the system comprising:
- initiating means for initiating an operation of fault detection;
- operation judging means for judging whether or not a predetermined time passes since initiating the operation of fault detection;
- sampling means for sampling data from said electric power system a predetermined times for each cycle of an electric quantity of said electric power system so as to produce sampled data successively;
- reference data rewriting means for rewriting a reference data by another reference voltage data produced from the sampled data until said predetermined time passes;
- detecting means for detecting a fault from the sampled data when said predetermined time passes;
- storing means for storing a hold command when a fault detection signal is applied from said detecting means;
- outputting means for outputting the sampled data from said sampling means within a second predetermined time in which the fault is detected, and for periodically outputting the sampled data for a third predetermined time after the second predetermined time: and
- resetting means for resetting the hold command in said storing means after the third predetermined time has passed.

12. A device for outputting information data in the form of a digital data obtained from an electric power system through detection of a fault in the system comprising:
- initiating means for initiating an operation of fault detection;
- operation judging means for judging whether or not a predetermined time passes since initiating the operation of fault detection;
- sampling means for sampling data from said electric power system a predetermined number of times for each cycle of an electric quantity of said electric power system so as to produce sampled data successively;
- reference data rewriting means for rewriting a reference data by another reference voltage data produced from the sampled data until said predetermined time passes;
- computing means for computing information data according to the fault detection signal as applied from said detecting means and for periodically computing the information data for a third predetermined time after the fault detection signal; and
- outputting means for outputting results provided by said computing means.

* * * * *